(No Model.)

F. OARE.
HEATING DEVICE FOR CURLING IRONS.

No. 579,302. Patented Mar. 23, 1897.

WITNESSES:
John Buckler
C. Gerst

INVENTOR
Frank Oare,
BY Edgar Tate & Co.
ATTORNEYS.

United States Patent Office.

FRANK OARE, OF GLOVERSVILLE, NEW YORK, ASSIGNOR TO WILLIAM J. DODGE, OF SAME PLACE.

HEATING DEVICE FOR CURLING-IRONS.

SPECIFICATION forming part of Letters Patent No. 579,302, dated March 23, 1897.

Application filed April 15, 1896. Serial No. 587,642. (No model.)

*To all whom it may concern:*

Be it known that I, FRANK OARE, a citizen of the United States, and a resident of Gloversville, in the county of Fulton and State of New York, have invented certain new and useful Improvements in Heating Devices for Curling-Irons, of which the following is a specification, reference being had to the accompanying drawings, forming a part thereof, in which similar letters of reference indicate corresponding parts.

This invention relates to heating devices for curling-irons, and the object thereof is to provide an effective device of this class which is simple in construction and operation and which is adapted to be mounted on or connected with a gas-burner, a lamp, or similar device, and the invention is fully disclosed in the following specification, of which the accompanying drawings form a part, in which—

Figure 1:
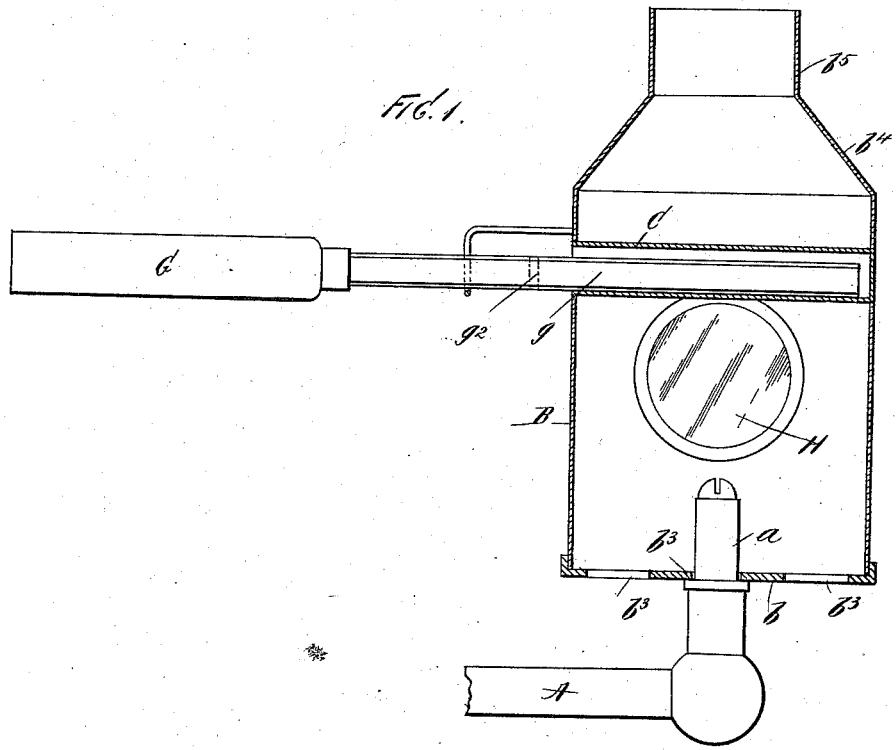
Figure 2:
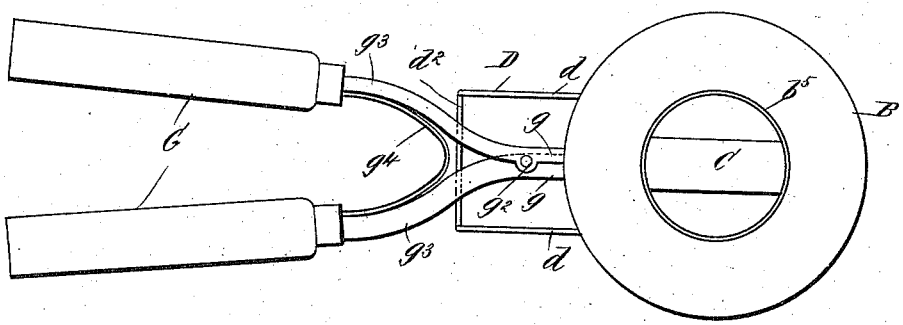

Figure 1 is a central vertical section of my improved heater, showing the same connected with a gas-burner and showing a curling-iron placed therein; and Fig 2, a plan view of the construction shown in Fig. 1.

In the drawings forming part of this specification, A represents a gas burner or fixture of the ordinary class which is provided with a burner-tube $a$, and in the practice of my invention I provide a heater which comprises a casing B, which is preferably cylindrical in form and provided with a bottom $b$, which is provided centrally with an opening $b^2$, through which the burner-tube $a$ is adapted to be passed, and said bottom $b$ is also provided with perforations or openings $b^3$ for the admission of air thereto.

The upper end or top of the casing B is conical in form, as shown at $b^4$, and provided with a tubular vertical extension $b^5$, and formed in one side thereof is a transverse chamber C, which is preferably tubular in form and open at one end, and connected with the side of the casing, adjacent to the open end of the transverse chamber C, is a yoke D, provided with side arms, which are connected with said casing, as shown at $d$, and with a cross-head $d^2$.

I have also shown a curling-iron comprising the usual handles G, which are provided with the usual irons $g$, which are pivotally connected at $g^2$ and which are provided with shanks $g^3$, by which they are connected with the handles and between which is placed a spring $g^4$, but the curling-iron forms no part of this invention, and the same may be of any desired construction.

In practice the curling-irons are inserted into the transverse chamber C, as shown in the drawings, and the gas is ignited as it escapes from the burner-tube $a$, and the walls of the transverse chamber C and the curling-irons located therein will be quickly heated, as will be readily understood, and no dust, dirt, or carbon can collect on said irons.

It will be apparent that the casing B may be connected with an ordinary lamp, all that is necessary being to modify the form of the bottom $b$ to permit of this operation, and said casing is also provided in one side with a transparent door or panel H.

This device is simple in construction and operation and perfectly adapted to accomplish the result for which it is intended, and my invention is not limited to the form of the casing B or to other details of the construction herein described, and I therefore reserve the right to make all such alterations therein and modifications thereof as fairly come within the scope of the invention.

Having fully described my invention, I claim as new and desire to secure by Letters Patent—

A heater for curling-irons, comprising a casing having a bottom which is perforated, and adapted to be connected with a gas or other burner, said casing being also open at its upper end and provided with a transverse chamber which is open at one end and into which a pair of curling-irons are adapted to be inserted, said casing being also provided with a conical top and a tubular extension, and at one side with a yoke, the sides of which are secured thereto, and at each side of the open end of said transverse chamber, and which is adapted to support the outer portion of the curling-irons when they are inserted into said chamber, substantially as shown and described.

In testimony that I claim the foregoing as my invention I have signed my name, in presence of the subscribing witnesses, this 10th day of April, 1896.

FRANK OARE.

Witnesses:
WILLIAM A. MCDONALD,
JOHN W. BURR.